May 24, 1960

P. M. CACCIOLA 2,937,604

SEED PLANTER

Filed Sept. 5, 1958

INVENTOR.
PETER M. CACCIOLA

BY
J. Ledermann
ATTORNEY

United States Patent Office 2,937,604
Patented May 24, 1960

2,937,604
SEED PLANTER

Peter M. Cacciola, 157 E. 81st St., New York 28, N.Y.

Filed Sept. 5, 1958, Ser. No. 759,232

1 Claim. (Cl. 111—82)

This invention relates to seed planters, and although it is especially intended for use in small farms and gardens it is also applicable to larger farming areas.

The main object of the invention is the provision of new and useful improvements in seed planters, comprising, essentially, a hollow drum having wheels on its ends whereby the drum rotates with the wheels as the device is propelled, the drum being adapted to contain the seeds and having an outlet spout adapted to dig a hole in the soil once in each cycle of rotation and simultaneously to deposit one or more seeds into the hole.

Another object of the invention is the provision of a seed planter of the type mentioned, having means for varying the size of the outlet opening from the drum into the spout to fit the opening to various sizes of seeds or numbers of seeds to be discharged.

A further object of the invention is the provision of a follower behind the drum to cover the hole in which the seed is planted, and associated therewith means for lifting the follower to clear obstacles such as, for example, stones.

A still further object of the invention is the provision of a guide within the drum to guide the seeds by gravity toward the outlet opening into the spout.

The above as well as adidtional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing, Fig. 1 is a perspective view of a seed planter illustrating embodiments of the present invention.

Figure 1:
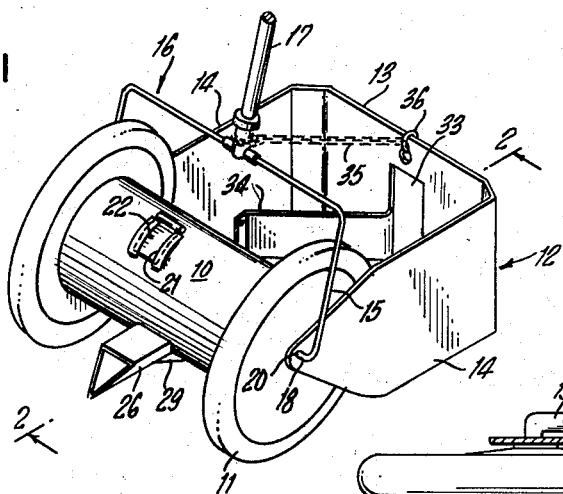
Figure 4:
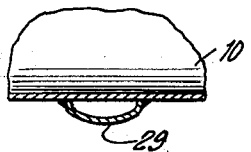
Fig. 4 is a sectional view taken on the line 4—4 of Fig. 2.
Figure 3:
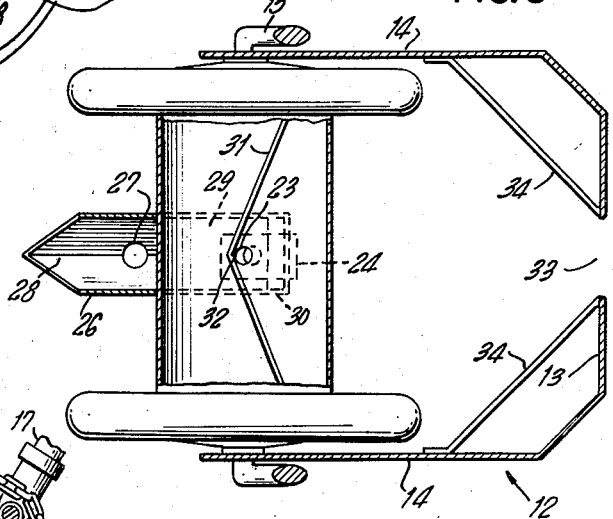
Fig. 3 is a sectional view taken on the line 3—3 of Fig. 2.

Referring in detail to the drawing, the numeral 10 indicates a hollow drum having wheels 11 secured thereto in axial relationship therewith, in any desired manner. A U-shaped follower frame 12 includes a rear portion or wall 13 and opposed side members or wings 14. This member may be connected with the wheels or drum in any suitable manner to permit rotation of the wheels and drum while merely dragging the follower behind it. One such way is illustrated in the drawing, and it utilizes the arms 15 of a handle yoke 16 having the elongated rod or handle 17 secured thereto in any common manner. The extremities 18 of the arms 15 are turned inward into mutual alignment; owing to the resiliency of the material of the yoke, the arms 15 which normally are in the mutually parallel position shown, may be readily spread apart. The wheels 11 have axial recesses 19, and the tips of the wings 14 have openings 20 therethrough. Thus the follower 12 is secured to the wheels by aligning the openings 20 with the wheel openings 19 and, after spreading the arms 15, permitting their extremities 18 to enter the aligned holes and recesses.

The drum has a feed opening 21, through which seeds are passed into the drum, provided with a slide door 22 for opening or closing the opening. Circumferentially distant from the opening 21 and positioned intermediate the length of the drum, the latter has an opening 23 covered by a slide door 24. The door 24 has an opening 25 therethrough adapted to be wholly or partly aligned with the opening 23. The opening 23 serves as a discharge passage for seeds from the drum, and the door 24, which is substantially similar to the door 22, serves to control the degree of opening of the passage; both doors are frictionally maintained in position at all times.

A discharge spout 26 extends outward from the drum and is triangular in cross-section, with the apex of the triangle at the bottom of the spout when the drum is positioned, as shown in Fig. 1, with the spout extending forward in the direction of travel of the device. Near its base, i.e., near the drum, the spout 26 has an inlet opening or passage through the floor 28 thereof, shown at 27. A chute 29 extends between the rear or base portion of the spout forward of the passage 27 to the drum rearward of the opening 23, and the rear wall 30 of the chute has the door 24 sliding thereunder.

A V-shaped guide 31 is provided against the inner surface of the drum, and its apex 32 is positioned just in advance of the outlet opening 23 of the drum.

Figure 2:
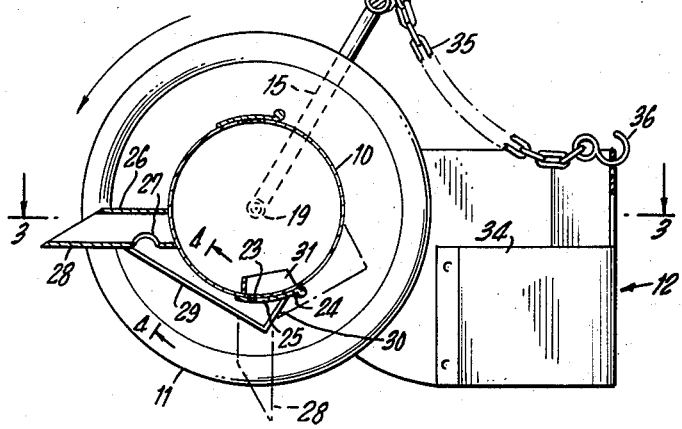
Fig. 2 is a sectional view taken on the line 2—2 of Fig. 1.

It is now apparent that, with seeds provided in the drum, when the device is propelled or pushed so that the drum rotates in the direction of the arrow, Fig. 2, some of the seeds inside the drum will be guided by gravity and the guide 31 toward the apex 32 of the latter and thus into the exit passage 23 and on to the chute 29. Further rotation of the drum will cause the seed or seeds to pass along the chute and into the spout 28 through the opening 27. Then, as the spout turns toward downwardly extending vertical position it will dig a hole or channel in the soil and simultaneously drop seeds or a seed thereinto. The same operation will be repeated during each cycle of rotation of the drum.

The back wall 13 of the follower 12 has a vertical slit 33 extending upward thereinto from the bottom, and further the follower has baffles 34 at the bottom extending between the side wings 14 and the vertical edges of the slit. As the follower is dragged behind the drum it is obvious that loose soil will be urged by the baffles toward and through the slit 33 to hill up the soil and cover the planted seed.

In order that the follower 12 may not be stopped or damaged by obstacles such as stones, means is provided for lifting it clear of the obstacle when the latter is noticed by the operator. One such means is illustrated, and it consists of providing a chain or the like 35 having one end secured at 36 to the top of the follower wall 13 and the other end secured to the base of the handle 17. Thus, by merely swinging the handle forward the follower will be tilted upward to clear the obstacle.

An important result obtained by using the planter above described is that the seeds will be planted at a fixed distance apart, in addition to achieving the planting without digging and bending on the part of the operator.

The invention having thus been described, what is claimed and desired to be secured by Letters Patent is as follows:

A seed planter comprising a hollow drum having wheels of larger diameter than the drum axially rigid on the drum, the drum having a seed inlet thereinto provided with a door and having a seed outlet therein circumferentially spaced from said inlet, a spout extending from the drum in the same vertical plane as said outlet beyond the imaginary cylinder defined by the circumferential edges of said wheels, the spout being triangular in cross-section and and having an apex of the triangle positioned lowermost when the planter is positioned with the spout extending forward in the direction of travel of the planter in which position of the spout the bottom wall is therefore V-shaped, the spout having an opening through said bottom wall thereof near the base thereof, a chute extending between said opening into the spout and a position beyond said outlet, the chute having a wall at the end thereof beyond said outlet at substantially right angles to the chute and closing said end of the chute, said wall having a transverse slot therein between the drum and said wall, a door slidably mounted on the drum and in said slot and having an opening therein adapted to be wholly or partly aligned with said outlet, and means for propelling said wheels forward and hence rotating said drum.

References Cited in the file of this patent

UNITED STATES PATENTS

| | | |
|---|---|---|
| 29,691 | Hariman | Aug. 21, 1860 |
| 196,954 | Terry | Nov. 6, 1877 |
| 210,535 | Hoshall | Dec. 3, 1878 |
| 623,783 | Heulings | Apr. 25, 1899 |
| 1,462,847 | Behrens | July 24, 1923 |

FOREIGN PATENTS

| | | |
|---|---|---|
| 537,684 | France | Mar. 8, 1922 |
| 55,317 | Germany | Feb. 11, 1891 |
| 531 | Great Britain | of 1857 |